United States Patent [19]
Schafer et al.

[11] Patent Number: 5,944,631
[45] Date of Patent: Aug. 31, 1999

[54] METHOD AND APPARATUS FOR AUTOMATICALLY SELECTING AN OVERDRIVE MODE IN ELECTRONICALLY CONTROLLED AUTOMOBILE TRANSMISSIONS

[75] Inventors: Gregory E. Schafer, Fairfield; Edward J. Prokopik, Stockton, both of Calif.

[73] Assignee: Intermotive, Inc., Fairfield, Calif.

[21] Appl. No.: 08/778,798

[22] Filed: Jan. 3, 1997

[51] Int. Cl.⁶ .................................................. B60K 41/06
[52] U.S. Cl. ........................... 477/115; 477/125; 477/902
[58] Field of Search ............................... 477/97, 99, 115, 477/125, 901, 902; 701/55, 56

[56] References Cited

U.S. PATENT DOCUMENTS

| | | |
|---|---|---|
| 4,462,276 | 7/1984 | Takano . |
| 4,471,437 | 9/1984 | Yoshino et al. ..................... 477/901 X |
| 4,726,262 | 2/1988 | Hayakawa et al. . |
| 4,846,022 | 7/1989 | Ito et al. .................................. 477/125 |
| 4,926,328 | 5/1990 | Funatsu et al. ..................... 477/125 X |
| 4,941,096 | 7/1990 | Ito et al. ............................... 477/97 X |
| 5,415,606 | 5/1995 | Kovalsky et al. ....................... 477/148 |

*Primary Examiner*—Charles A Marmor
*Assistant Examiner*—Sherry Lynn Estremsky
*Attorney, Agent, or Firm*—Dickinson Wright PLLC

[57] ABSTRACT

For motor vehicles equipped with overdrive-equipped transmissions normally biased in one of the overdrive or non-overdrive modes of operation, a method for automatically biasing the transmission to the alternate mode of operation, and apparatus to practice the method. Normally used to bias transmissions from the overdrive to the non-overdrive mode of operation, the apparatus and method taught herein are particularly well-suited for operation in conjunction with automatic transmissions, and are actuated uniquely with each ignition run cycle. Alternatively, the method and apparatus may, with equal facility, incorporate other vehicle operations and conditions to actuate its overdrive biasing function.

25 Claims, 1 Drawing Sheet

Pinout
1 Ground
2 Trigger
3 Output
4 Reset
5 Control Voltage
6 Threshold
7 Discharge
8 $V_{OC}$ $T^* = 1.1 R_T C_T$

5,944,631

METHOD AND APPARATUS FOR AUTOMATICALLY SELECTING AN OVERDRIVE MODE IN ELECTRONICALLY CONTROLLED AUTOMOBILE TRANSMISSIONS

FIELD OF THE INVENTION

The present invention relates to the control of automotive transmissions. More specifically, the present invention provides a method for inverting the normal selection operation of the overdrive feature in electronically controlled automotive transmissions. By practicing the method taught herein, an electronically controlled transmission which would normally select the overdrive mode of operation will now automatically select the non-overdrive mode with each ignition run cycle.

BACKGROUND OF THE INVENTION

Many currently produced vehicles, including but not necessarily limited to light duty trucks and passenger vehicles, are equipped with electronically controlled transmissions. These transmissions may be automatic or manual transmissions. Many of these transmissions contain an overdrive feature which is electronically controlled. This electronic control may be logically implemented as a CMOS chip, manually by means of a switch, or a combination of both. CMOS control may be implemented internally in the transmission itself, or by means of power train control module (PCM), transmission control module (TCM), or other external logic module. The most commonly occurring implementation of this general design strategy is that where the transmission is biased toward the overdrive mode of operation with each ignition run cycle by means of a PCM. It should be noted that the terms "PCM" and "TCM" as used herein include, but are not necessarily limited to, their normal SAE J1930 meanings.

While the previously discussed normally biased mode of operation is preferred for many applications, including passenger service and the transport of light loads in relatively flat terrain, there are some vehicle applications where the preferred mode of transmission operation is the non-overdrive, or standard drive, mode of operation. Examples of some such vehicle applications include truck fleets, taxi cab fleets, limousine fleets, motor home drivers, and tow truck drivers who often run their vehicles at close to the vehicle's gross weight capacity and/or in hilly areas, and vehicles involved in towing. Where the overdrive mode of transmission operation is selected and the vehicle is used in these exemplar applications, several negative concomitants ensue: first, brake wear is increased because the engine braking feature is disconnected with overdrive operation; wear on the transmission's torque converter as well as the transmission's bands and clutches are increased due to constant shifting in and out of overdrive ("hunting") when driving in hilly terrain; finally, for both of the foregoing reasons, vehicle safety may be negatively impacted.

The previously discussed problem is often exacerbated when the vehicles are operated as part of a fleet, or rental operation. In this situation the vehicles' owners must rely on their driver-employees, or vehicle renters, to manually de-select overdrive mode when hauling heavy loads or driving over hilly terrain. Operators of these fleet vehicles often forget to do so and do not, therefore, manually disengage overdrive. Accordingly, the vehicle owner suffers increased brake and transmission maintenance costs.

In order to overcome the previously discussed problem, mechanical "overdrive halvers" have been developed as an after-market device. After-market dealers mount these devices between the vehicle's transmission and rear differential thereby mechanically reducing the effect of the transmission overdrive. It should be noted that these devices do not actually disengage the overdrive function and therefore do not provide a true non-overdrive mode of operation. Furthermore, these mechanical devices are relatively expensive to install.

What is needed then is a simple, effective method for inverting the function of the overdrive select feature of electronically-controlled transmissions. The method, and an apparatus to practice that method, should preferably be durable, of moderate cost, and retain full functionality of the vehicle's overdrive system.

Further, the method should automatically invert the non-biased mode of operation each time the vehicle ignition is set to "on". In most cases, this will have the effect of selecting the non-overdrive mode of operation each time the vehicle ignition is switched on.

In a normal cycle, the vehicle key (and hence the ignition switch) is cycled from off to the run position, momentarily to the start position and back to the run position. During the development of the present invention, one additional problem became clear: some early models of an apparatus developed to perform the method taught and claimed herein reset themselves with each engine crank cycle, as opposed to each ignition run cycle. This is important where more than one effort must be made to start the engine during a given ignition cycle. This is often the case in diesel engines, and occasionally occurs in other types of internal combustion engines as well. What is further needed then, is that the method for inverting the function of the overdrive select feature possess a "multiple crank" capability, which capability ensures that only one inverter signal be transmitted to the transmission's overdrive control for each ignition run cycle, even if several efforts, or start cycles, must be made to start the engine within the run cycle. This would preclude the inadvertent biasing of the transmission back into the overdrive mode responsive to a second or subsequent start attempt.

Finally, the functionality of the overdrive select button and driver's overdrive indicator, if fitted, should be retained: the vehicle operator should retain the option of manually engaging overdrive when it is desirous to do so, and should continue to have indication of the overdrive mode selected. When engaged, normal operation of the vehicle's overdrive mode should not in any way be impinged.

DISCLOSURE OF INVENTION

The present invention teaches a method for inverting the normal operation of an electronically controlled automobile transmission equipped with the overdrive feature, and an apparatus to perform the method. Where the normal bias of the transmission is to the overdrive mode of operation, the apparatus taught herein, in operative combination with the vehicle's transmission, operates to select the nonoverdrive mode of operation each time the vehicle ignition is switched on. Conversely, where the normal bias is to the non-overdrive mode of operation, the apparatus taught herein, in operative combination with the vehicle's transmission, operates to select the overdrive mode of operation each time the vehicle ignition is switched on.

Because the apparatus taught herein senses the beginning of the ignition run cycle, and discriminates against false indications of engine operation occasioned by multiple start cycles, the advantages taught by the present invention further comprehend a "multiple crank capability", allowing a plurality of crank cycles within an ignition run cycle without generating any spurious inverter signals which would serve to re-set the transmission to the normally biased mode of operation.

Finally, the method and apparatus taught herein do not in any way interfere with the driver's normal control of the transmission, or of the indications of transmission operation mode made to the driver. The driver retains the ability to manually select between overdrive and non-overdrive modes of operation at will. The vehicle's overdrive indicator, if installed, continues to function properly.

In one embodiment, the apparatus which practices the method taught herein comprises an electronic device which is inserted into the vehicle's transmission overdrive wiring. The device senses the application of power to a component associated with engine operation, for instance, the vehicle's ignition coil power supply is a source of power associated with the start and end of an ignition run cycle. On sensing power, this apparatus generates an output signal which mimics the action of the overdrive select switch. This signal is sent to the PCM which, through the transmission overdrive switch then sets, or biases, the non-overdrive mode of operation.

The method taught herein does not disengage the overdrive feature of a vehicle: it merely sets the non-overdrive mode of operation. The vehicle operator retains the ability, by manually activating the overdrive select switch, to engage or in turn disengage the overdrive feature at any time.

For vehicles, particularly fleet vehicles, operated under conditions of high load and/or in hilly terrain, utilization of the method and apparatus taught herein will provide several benefits: there is no need to manually cancel the overdrive mode of operation; the use of the present invention results in increased brake performance and brake life, increased transmission durability, improved torque converter durability; increased safety; reduced shift hunting; and reduced maintenance costs.

It should be noted that while a preferred embodiment of the present invention incorporates an electronic device to mimic the action of the overdrive select switch, it should be apparent to those of ordinary skill in the art that alternative actuation methodologies may, with equal facility, be implemented to perform the method taught herein. Such alternative actuation methodologies include, but are not necessarily limited to electric relays, electronic tubes, discrete bipolar electronic transistors, and a variety of mechanical actuation means including but, again, not necessarily limited to pneumatic, hydraulic, or vacuum actuators designated as A in FIG. 1.

Other features of the present invention are disclosed or apparent in the section entitled, "BEST MODE OF CARRYING OUT THE INVENTION".

BRIEF DESCRIPTION OF THE DRAWINGS

For fuller understanding of the present invention references made to the accompanying drawing in the following detailed description of the BEST MODE OF CARRYING OUT THE INVENTION in the drawing.

Figure 1:
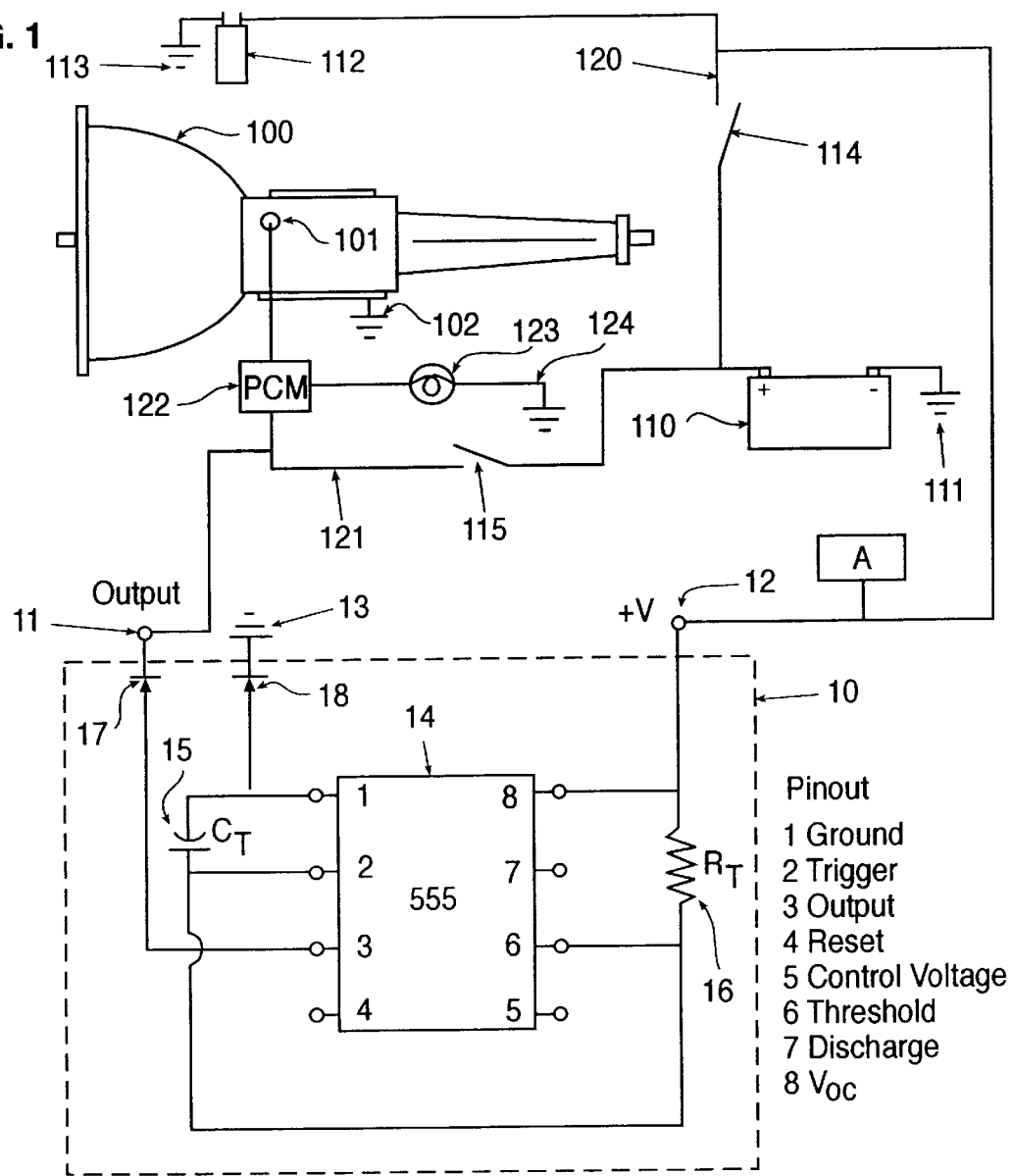
FIG. 1 is an overview of the present invention including details of construction of a preferred embodiment of an apparatus constructed according to the present invention.

Reference numbers refer to the same or equivalent parts of the invention throughout the several figures of the drawing.

BEST MODE OF CARRYING OUT THE INVENTION

Referring now to FIG. 1, an installation schematic of a preferred embodiment of the present invention is shown. Automotive transmission 100 is typically installed between an engine and the vehicle's drive wheels (not shown). Other vehicle components shown hereon are described as follows: storage battery 110 provides electrical storage power for the vehicle and forms part of the electrical distribution path for the vehicle's electrical system; the vehicle's ignition coil 112 is connected to battery 110 by means of ignition wiring 120 and ignition switch 114; the vehicle chassis (not shown) provides a ground for the several components attached thereto, including but not limited to transmission 100 at ground 102, battery 110 at ground 111, ignition coil 112 at ground 113, PCM at ground 124, and inverter ground 13. It should be noted that transmission 100 in this exemplar is an electronically-controlled automatic transmission having an electrically-actuated overdrive selector 101 operated by PCM 122 in operative combination therewith. By way of illustration, but again not limitation, to achieve the advantages discussed herein the present invention may be implemented on any number of electronically controlled transmissions, including but not limited to various automatic transmissions manufactured by Borg-Warner Corporation, type E40D transmissions, as well as other transmissions well known to those of ordinary skill in the art.

Overdrive selector 101 is toggled through PCM 122 by means of overdrive selector switch 115 which is connected by overdrive selector switch wiring 121 to battery 110. Overdrive selector 101 biases transmission 100, at the vehicle operator's selection, between the overdrive and non-overdrive modes of operation.

Indicator lamp 123 is electrically connected to PCM 122 and serves to notify the vehicle operator of the operational status of the overdrive feature. In many vehicles, this takes the form of an illuminated indication that the overdrive is off. Indicator lamp 123 is grounded at 124.

It should be noted that the automatic transmission in this exemplar is typical of most electronically controlled automatic transmissions, in that logic circuitry (in this case implemented as PCM 122) normally biases the transmission to operate in the overdrive mode with each ignition run cycle. This logic may be internally implemented within the transmission, or externally implemented by means of an exterior electronic transmission control module. In either case the logic device serves to set, or bias, the transmission to the overdrive mode of operation with each ignition run cycle. Alternatively, some transmissions may be biased for operation in the non-overdrive mode of operation with each ignition run cycle. In such applications, the present invention may be utilized to bias such transmissions to the overdrive mode of operation, again while retaining to the operator full selectability between the overdrive and non-overdrive modes of operation.

Having continued reference to FIG. 1, an apparatus which practices the method taught herein, hereafter referred to as an "Overdrive Inverter", 10, is shown. In this preferred embodiment overdrive inverter 10 takes the form of an electronic circuit, for instance a printed circuit board having mounted thereon a plurality of electronic components which are discussed as follows: a "555" integrated circuit timer, 14;

a resistor 16; a capacitor 15; first and second diodes 17 and 18; which electronic components are joined in any of several configurations, including the previously mentioned printed circuit board, well-known to those of ordinary skill in the art, including but not necessarily limited to printed circuit boards, wiring, cabling, integrated circuits, or the like. The several electronic elements of this preferred embodiment may be connected in any manner well known to those having ordinary skill in the art including soldering, wire-wrapping, welding or brazing, or by means of implementation as an integrated circuit containing the several elements thereof. Furthermore, the several components of overdrive inverter 1 may be housed, encapsulated, mounted, or contained within any electronic mounting or containment means known by those having ordinary skill in the art.

The 555 integrated circuit timer, 14, used in this embodiment was originally developed by Signetics Corporation, and is now available from a number of integrated circuit manufacturers. One such device suitable for use in this embodiment is the Fairchild Semiconductor UA555TC. The structure and operation of this device are discussed at pp 243–246 of *The Linear IC Handbook*, Michael S. Morley. TAB Books, 1986, which is hereby incorporated by reference. Diodes 17 and 18 are 1 watt, 18 volt zener diodes which protect inverter 10 from unwanted fly-back voltage. Resistor 16 is a 2 megohm resistor. Capacitor 15 is a 1 microfarad capacitor. Timer 14, resistor 16, capacitor 15 and diodes 17 and 18 are mounted, in the manner well known to those of ordinary skill in the art, on a printed circuit board (not shown) in this preferred embodiment. The connections therebetween are shown in FIG. 1, and explained as follows:

A voltage lead, 12, connects to ignition wiring 120 or another power source which is only energized when the vehicle's ignition switch is in the "run" position. Voltage lead 12, output 11 and/or inverter ground 13 may be attached to the vehicle's wiring by means of insulated wiring and wire tapping clips, or other electrical connection methodology well known to those of ordinary skill in the art. Voltage lead 12 connects directly to pin 8 ($V_{oc}$) of timer 14, by means of resistor 16 to pin 6 (threshold) and pin 2 (trigger) thereof, thence by means of capacitor 15 to pin 1 (ground) and diode 18. Diode 18 connects to ground at 13. Pin 3 provides the output, which is attached to the vehicle's overdrive selection circuit, 121 by means of diode 17.

When ignition switch 114 is closed, ignition wiring 120 is energized thereby energizing voltage lead 12. Ground 13 completes the circuit, causing inverter 10 to transmit, by means of output 11, a signal to PCM 122, which toggles overdrive selector 101 to the alternate mode of operation. This signal mimics the signal transmitted by overdrive selector switch 115 when the operator manually selects between the overdrive and non-overdrive modes of operation. In this manner, overdrive selector 101 is automatically transmitted, by means of PCM 122, a signal mimicking the operator's manual selection of the non-overdrive mode of operation with each ignition run cycle. Further, this signal does not interfere with the transmission's normal operation, with the operator's ability to manually select between overdrive and non-overdrive modes of operation, or with the indicators, if any, of overdrive function.

Figure 2:
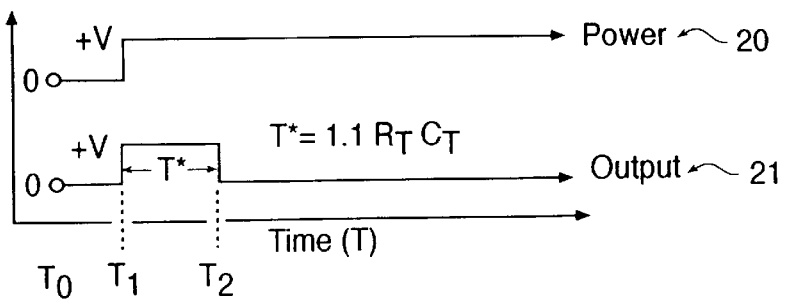
FIG. 2 is a timing diagram showing the method of operation of a preferred embodiment of the present invention.

The previously discussed signal transmitted by overdrive inverter 10 to transmission 100 is of duration $T^*$, where $T^*=1.1\ R_T C_T$, and is shown in FIG. 2. Having reference to that figure, at 20 is a representation of the voltage level over time T at an engine power source, for instance the ignition wiring 120 shown in FIG. 1. At 21 is shown the voltage level at output 11 shown in FIG. 1. At time $T_0$, prior to initiation of the ignition run cycle, the voltage level at both the vehicle's power source and inverter output is zero. At time $T_1$, the engine power source is energized to initiate the ignition run cycle. As previously discussed, this energizes the overdrive inverter (not shown in this figure), causing the transmission of a signal mimicking the overdrive selector switch. Again, as previously discussed, the duration, $T^*$, of this signal is equal to the product of 1.1 times the resistance, $R_T$, of resistor 16 (not shown in this figure) and the capacitance, $C_T$, of capacitor 15 (not shown in this figure). By time $T_2$ the signal has caused the selection of the nonoverdrive mode of operation by overdrive selector 101 (not shown in this figure), and inverter 10 (not shown in this figure) ceases transmitting the signal.

As a further option, alternative inputs may be made to the overdrive inverter described whereby that inverter is initiated. By way of illustration, but not limitation, such alternative inverter initiators designated as A in FIG. 1, may include: brake actuation signals; inclination indicators; speed indicators; cruise control indicators; various engine control signals; fuel flow signals; air flow signals; and other indications or actions of vehicle control or condition.

Finally, it should be noted that references made herein to "overdrive" and "non-overdrive" generally refer to the biased and non-biased modes of operation of a given transmission. While this is generally the case, the present invention specifically contemplates the implementation thereof on transmissions where the normal, biased mode is to the non-overdrive mode, and the non-biased mode is to the overdrive mode. Accordingly, the present invention specifically contemplates implementation whereby its installation in a vehicle normally biased to the nonoverdrive mode of operation results in the automatic biasing to the overdrive mode with each ignition run cycle.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. Alternative actuation methodologies, circuit designs, circuit implementations, and connection methodologies, as discussed herein, are all contemplated by the teachings of the present invention. Further, the principles of the present invention may, with equal facility, be implemented on a wide variety of automatic and non-automatic transmissions, whether normally biased in the overdrive or non-overdrive mode of operation. The invention disclosed herein may be practiced without any element which is not specifically disclosed herein.

What is claimed is:

1. For a motor vehicle including an engine and an electronically controlled transmission, said transmission including an overdrive. the operation of said overdrive being selectable by a user between an overdrive mode of operation and a non-overdrive mode of operation by means of an overdrive selector switch, a method for automatically biasing said operation of said overdrive to said non-overdrive mode of operation with each ignition run cycle while retaining to said user the continued ability to select between said overdrive mode of operation and said non-overdrive mode of operation, said method comprising the steps of:

determining the start of an ignition run cycle;

responsive to said determining step, transmitting a signal to said transmission mimicking the operation of said overdrive selector switch, whereby said signal biases said transmission to said non-overdrive mode of operation with each said ignition run cycle.

2. The method of claim 1 comprising the further step, responsive to said determining step, of ensuring that only one said signal is transmitted to said transmission for each ignition run cycle.

3. For a vehicle equipped with a transmission including an overdrive, the operation of said overdrive being selectable by a user between a first normally-biased mode of operation and a second mode of operation, a method for automatically biasing said operation of said overdrive from said first normally-biased mode of operation to said second mode of operation, the method comprising the steps of:

sensing the beginning of an ignition run cycle; and responsive to said sensing step, transmitting a signal to said overdrive transmission for selecting said second mode of operation.

4. The method of claim 3 applied to an automatic transmission wherein said first normally-biased mode of operation is the overdrive mode, the transmitting step further comprising the step of transmitting said signal to said overdrive transmission for selecting a non-overdrive mode of operation.

5. The method of claim 3 applied to an automatic transmission wherein said first normally-biased mode of operation is the non-overdrive mode, the transmitting step further comprising the step of transmitting said signal to said overdrive transmission for selecting an overdrive mode of operation.

6. The method of claim 3 comprising the further step of providing an actuator adapted to transmit a signal from the group consisting of: electrical signal; pneumatic signal; hydraulic signal; and vacuum signal.

7. The method of claim 3 comprising the further step of ensuring that only one said signal is transmitted to said overdrive transmission for each said ignition run cycle.

8. The method of claim 3 further comprising the step of providing an alternative input and signal to said overdrive transmission for biasing said operation of said overdrive, wherein the alternative input and signal is initiated by an actuator selected from the group consisting of: inclination indicator; speed indicator; cruise control indicator; engine control signal; fuel flow signal; air flow signal; brake actuation signal; vehicle control indication; vehicle control action; and vehicle condition indication.

9. For a motor vehicle equipped with an overdrive transmission, said transmission including an overdrive, the operation of said overdrive being selectable by a user between an overdrive mode of operation and a non-overdrive mode of operation, a method for automatically biasing said operation of said overdrive to said non-overdrive mode of operation with each ignition run cycle while retaining to said user the continued ability to select between said overdrive mode of operation and said non-overdrive mode of operation, the method comprising the steps of:

sensing the beginning of an ignition run cycle; and responsive to said sensing step, transmitting a signal to said overdrive transmission for selecting said non-overdrive mode of operation.

10. The method of claim 9 comprising the further step of providing an actuator adapted to transmit a signal from the group consisting of: electrical signal; pneumatic signal; hydraulic signal; and vacuum signal.

11. The method of claim 9 comprising the further step of ensuring that only one said signal is transmitted to said overdrive transmission for each said ignition run cycle.

12. For a motor vehicle including an engine and an electronically controlled transmission, said transmission including an overdrive, the operation of said overdrive being selectable by a user between an overdrive mode of operation and a non-overdrive mode of operation by means of an overdrive selector switch, a method for automatically biasing said operation of said overdrive to said non-overdrive mode of operation with each ignition run cycle while retaining to said user the continued ability to select between said overdrive mode of operation and said non-overdrive mode of operation, said method comprising the steps of:

determining the start of an ignition run cycle;

responsive to said determining step, transmitting an electrical signal to said transmission mimicking the operation of said overdrive selector switch; and further responsive to said determining step, ensuring that only one said transmitting step is performed for each ignition run cycle, whereby said electrical signal biases said transmission to said non-overdrive mode of operation once and only once for each said ignition run cycle, while enabling a plurality of crank cycles for each said ignition run cycle.

13. The method of claim 12 comprising the further steps of:

receiving an initiation input from a vehicle component; and performing said transmitting step responsive to the combination of a determination by said determining step of the start of an ignition run cycle and the receipt, by said receiving step, of said initiation input.

14. The method of claim 13 wherein said initiation input of said receiving step is initiated by actuator selected from the group consisting of: inclination indicator; speed indicator; cruise control indicator; engine control signal; fuel flow signal; air flow signal; brake actuation signal; vehicle control indication; vehicle control action; and vehicle condition indication.

15. For a vehicle equipped with a transmission including an overdrive, the operation of said overdrive being selectable by a user between a first normally-biased mode of operation and a second mode of operation, an apparatus for automatically biasing said operation of said overdrive from said first normally-biased mode of operation to said second mode of operation, the apparatus comprising:

sensing means for sensing the beginning of an ignition run cycle; and responsive to the sensing of the beginning of an ignition run cycle by said sensing means, means for transmitting a signal to said transmission including an overdrive for selecting said second mode of operation.

16. The apparatus of claim 15 wherein said first normally-biased mode of operation is an overdrive mode, and said second mode of operation is a non-overdrive mode.

17. The apparatus of claim 15 wherein said first normally-biased mode of operation is a non-overdrive mode, and said second mode of operation is an overdrive mode.

18. The apparatus of claim 15 wherein said signal is selected from the group consisting of: electrical signal; pneumatic signal; hydraulic signal; and vacuum signal.

19. The apparatus of claim 15 further comprising means for ensuring that only one said signal be transmitted to said transmission including an overdrive for each said ignition run cycle.

20. For a motor vehicle equipped with a transmission including an overdrive, the operation of said overdrive being selectable by a user between an overdrive mode of operation and a non-overdrive mode of operation, an apparatus for automatically biasing said operation of said overdrive to said non-overdrive mode of operation with each ignition run cycle while retaining to said user the continued ability to select between said overdrive mode of operation and said non-overdrive mode of operation, the apparatus comprising:

a sensor adapted to sense the beginning of an ignition run cycle; responsive to the sensing of the beginning of an ignition run cycle by said sensor a transmitter adapted to transmit a signal to said transmission including an overdrive for selecting said non-overdrive mode of operation.

21. The apparatus of claim 20 wherein said apparatus is adapted to ensure that only one said signal is transmitted to said transmission for each said ignition run cycle.

22. For a motor vehicle including an engine, an electrical circuit for energizing said engine, and an electronically controlled transmission in operative combination with said engine, said transmission including an overdrive controlled by a transmission logic unit, the operation of said overdrive being selectable by a user between an overdrive mode of operation and a non-overdrive mode of operation by means of an overdrive selector switch actuating said transmission logic unit, an apparatus for automatically biasing said operation of said overdrive to said non-overdrive mode of operation with each ignition run cycle while retaining to said user the continued ability to select between said overdrive mode of operation and said non-overdrive mode of operation, said apparatus comprising:

a timer, in operative combination with said electrical circuit and said transmission logic unit, said timer including a detector adapted to detect the start of an ignition run cycle;

a transmitter in operative combination with said timer, for transmitting, responsive to the detection of said start of said ignition run cycle by said detector, a signal to said transmission control unit mimicking the operation of said overdrive selector switch; and a system, in operative combination with said timer and further responsive to said detection of said start of said ignition run cycle by said detector, for ensuring that only one said signal is transmitted for said ignition run cycle, whereby said signal biases said transmission to said non-overdrive mode of operation once and only once for each said ignition run cycle. while enabling a plurality of crank cycles for each said ignition run cycle.

23. The apparatus of claim 22 wherein said transmitter is adapted to actuate said transmission control unit and mimic the operation of said overdrive selector switch upon the receipt of an alternative input.

24. The apparatus of claim 23 wherein said alternative input and/or signal is initiated by an actuator selected from the group consisting of: inclination indicator; speed indicator; cruise control indicator; engine control signal; fuel flow signal; air flow signal; brake actuation signal; vehicle control indication; vehicle control action; and vehicle condition indication.

25. The apparatus of claim 22 further comprising at least one diode in operative electrical combination with said timer.

* * * * *